United States Patent [19]

McGowan et al.

[11] 3,895,963

[45] July 22, 1975

[54] PROCESS FOR THE FORMATION OF BETA ALUMINA-TYPE CERAMICS

[75] Inventors: H. Christopher McGowan; Joseph A. Male, both of Piscataway; Malcolm G. McLaren, Milford, all of N.J.

[73] Assignee: Exxon Research & Engineering Co., Linden, N.J.

[22] Filed: Dec. 20, 1972

[21] Appl. No.: 316,731

[52] U.S. Cl. ............. 136/153; 136/6 FS; 136/6 LF; 136/20; 136/83 R; 136/100 R; 106/73.4
[51] Int. Cl. .......................................... H01m 11/00
[58] Field of Search .......... 136/153, 6 FS, 6 LF, 20, 136/83 R, 100 R; 264/61; 106/73.4

[56] References Cited
UNITED STATES PATENTS

| | | | |
|---|---|---|---|
| 3,468,719 | 8/1969 | Tennenhouse | 136/153 |
| 3,518,756 | 7/1970 | Bennett et al. | 264/61 X |
| 3,607,436 | 9/1971 | Charler | 136/153 |
| 3,671,324 | 5/1972 | Iwai et al. | 136/153 |
| 3,707,589 | 12/1972 | Chiku et al. | 136/153 X |
| 3,719,531 | 3/1973 | Dziecurch et al. | 136/153 |
| 3,765,915 | 10/1973 | Duncan et al. | 106/73.4 |

*Primary Examiner*—Winston A. Douglas
*Assistant Examiner*—John F. Niebling
*Attorney, Agent, or Firm*—A. D. Litt; J. W. Ditsler

[57] ABSTRACT

A process is described for the preparation of low electrical resistivity beta alumina-type ceramics comprising forming a finely divided, homogeneous mixture of alpha alumina, sodium oxide and dopant, preferably $Li_2O$ or MgO, where the alumina/sodium oxide mole ratio, in the mixture, ranges between about 5 and 11 and calcining the mixture at a temperature below about 1150°C. and preferably ranging between about 85° and 1100°C. The calcined mixture is then milled and formed into a green body of high density containing a major amount of alpha alumina and, thereafter, fired, in a sintering operation, at a temperature ranging between about 1400° and 1700°C., thereby yielding the desired beta alumina-type ceramic containing a major amount of beta" alumina.

14 Claims, No Drawings

PROCESS FOR THE FORMATION OF BETA ALUMINA-TYPE CERAMICS

BACKGROUND OF THE INVENTION

1. Field of the Invention

The present invention relates to a process for the preparation of beta alumina-type ceramics. More specifically, the process relates to the preparation of a beta alumina-type ceramic characterized by having a high density, low electrical resistivity, uniform thickness and good mechanical strength. Still more specifically, the process of the subject invention is directed to the preparation of superior beta alumina-type ceramics by proper selection of the alumina source and by proper control of the calcination temperature.

2. Description of the Prior Art

Development of new low polluting energy conversion devices is of major interest to scientists and engineers throughout industry. A relatively new development in this area is the sodium-sulfur electrolytic cell disclosed in U.S. Pat. No. 3,404,036 issued Oct. 1, 1968. The cell contains molten alkali metal in the cathodic cavity, preferably sodium metal, and molten sulfur in the anodic cavity. The two reaction zones are separated by means of an ionically conductive solid electrolyte, crystalline in nature, and preferably compresing a beta alumina-type ceramic.

The classical formula for the sodium form of beta alumina has been thought to be $NaO \cdot 11Al_2O_3$. More recent findings have suggested that the $Al_2O_3/Na_2O$ mole ratio is not fixed but, rather, can vary taking values ranging between about 9/1 and about 11/1. Beta alumina is a crystalline material characterized by having a low cationic resistivity (e.g., for $Na^+$ ions), while otherwise being impermeable to bulk liquids. It is noted that other metals, such as potassium, may be used in lieu of sodium although possibly effecting, to a substantial degree, the electrical resistivity properties of the ceramic. In the latter case, however, only $k^+$ ions can be transported through the ceramic.

Some time after the discovery of beta alumina, a new crystalline material having a $Al_2O_3/Na_2O$ mole ratio ranging between about 5 and about 7 was reported and termed beta″ alumina. In general, beta″ alumina is characterized by having a lower cationic resistivity than the beta form and has thus been preferred in electrolytic cell operation, either in the pure form or as a mixture. It should be noted that the exact composition of beta″ and beta alumina has not been precisely ascertained and that the cited ranges are approximate values for the $Al_2O_3/Na_2O$ mole ratio.

Problems have been confronted in the prior art relating to the development of a commercially feasible process for the preparation of such beta alumina-type membranes, which are of low electrical resistivity, of sufficient mechanical strength to allow integration into an electrolytic cell configuration, and of sufficient bulk density so as to be impervious to the chemical reactants in the cell. In general, prior art techniques have not been successful in providing beta alumina ceramics having the requisite characteristics. Typical of such prior art processes is that described in U.S. Pat. No. 3,488,271, assigned to Ford and patented Jan. 6, 1970, wherein a mixture of sodium carbonate and gamma aluminum oxide, the latter having an average particle size (diameter) of about 0.05 microns and a narrow particle size distribution and further characterized by having a cubic crystal structure, are heated to a temperature ranging as high as 1593°C., thereby forming a molten eutectic, which, when cooled to room temperature, yeilds the desired sodium beta alumina, embedded in $NaAlO_2$. The mixture is then dissolved in water to remove particles of $NaAlO_2$ therefrom and the resulting powder isostatically pressed into pellets at pressures as high as about 110,000 psi, and at ambient temperatures. The pellets are then sintered at temperatures between about 1500° and 1800°C. thereby producing the finished product. Small amounts of doping agents such as $Li_2O$, MgO and the like may be added to the initial mixture to increase the overall stability and conductivity of the beta alumina.

The beta alumina ceramic prepared by this process has been found to have relatively low ionic resistivity which substantially increases the overall efficiency of the beta alumina ceramic in electrolytic cell operations. However, the need for relatively high "isostatic pressing" pressures is economically impractical.

Similar processes are described in U.S. Pat. Nos. 3,625,773, 3,607,435, issued Dec. 7, 1971 and Sept. 21, 1971, respectively, and both assigned to General Electric Company. The latter processes suffer from the same disadvantages as those discussed, supra, in reference to the '271 process. In addition, other processes, such as extrusion, where a formulated blend is extruded into a tube and subsequently fired to provide the rigid final beta alumina ceramic product have failed to provide the low resistivity beta alumina ceramics required for use in the sodium-sulfur type electrolytic cells.

Attempts have been made to circumvent many of the problems confronted in other prior art processes by using cheaper alumina sources, such as alpha alumina. Typical of such prior art processes is that disclosed in U.S. Pat. No. 3,607,435 assigned to General Electric Company and patented Sept. 21, 1971. Specifically this process comprises preparing a mixture of alpha alumina and sodium meta aluminate, compacting this mixture to form a green body and firing same, in a dry oxygen-containing atmosphere at a temperature ranging between about 1600° and 1900°C. Preferably magnesium chloride and yttrium chloride are incorporated into the mixture prior to forming the green body. The type of alpha alumina used in the General Electric process, however, is still quite expensive and is characterized by having an hexagonal crystal structure, an average particle size less than 1 micron, preferably about 0.3 microns and a narrow particle size distribution. It has been found that the sintered beta-type alumina membranes derived from this process are characterized by having a relatively high electrical resistivity. In addition, the high cost of the starting alpha alumina material is economically unattractive.

SUMMARY OF THE INVENTION

In accordance with the present invention, it has now been found that a beta alumina-type ceramic containing a major amount of beta″ alumina suitable for use as an electrolyte in an electrolyte cell, can be prepared having low electrical resistivity and superior mechanical strength by use of the process of the subject invention. The ceramic composition can be represented by the formula $R_2O \cdot XAl_2O_3$, R being an alkali metal, preferably sodium, and X taking values ranging between about 5 and 11, preferably, between about 5 and 7. The process involves preparing a finely divided mixture comprising alpha alumina and an alkali metal oxide, where the mole ratio of alpha alumina to alkali metal oxide in the mixture ranges between about 5 and about 11, calcining the mixture at a temperature ranging between about 850° and 1150°C., the temperature sufficient to consolidate the alpha alumina and alkali metal oxide but insufficient to cause substantial reaction of same to form beta and/or beta'' alumina, forming the thus calcined mixture thereby obtaining a green body of high density containing a major amount of alpha alumina, and firing (sintering) the green body at a temperature ranging between about 1400° and 1700°C., yielding a beta alumina-type ceramic containing a major amount of beta'' alumina. The ceramic is characterized by having an electrical resistivity, measured at 25°C., of less than about 250 and preferably less than about 100 ohm-centimeters, a substantially uniform thickness ranging between about 1 and 250 mils, and a density greater than about 85% of theoretical density and preferably between about 90 and 100% of theoretical. Thus, for example, the density may range between about 2.75 and 3.25 g/cm.

The alpha alumina material of the subject process can be prepared synthetically by methods well known in the art, or found in nature, either in the anhydrous or hydrated forms and is characterized by having a particle surface area ranging between about 2 and 110 square meters per gram, preferably between about 7 and 12 square meters per gram, and an average particle size (diameter) ranging between about 0.01 and 7 microns, preferably between about 0.05 and 1.0 microns. In addition, for any particular particle size, the distribution of same in the gross alumina material may vary widely, e.g., for a 1 micron particle size, the distribution may range between about 0.1 and 4 microns. This is contrasted with the alpha alumina used in the U.S. 3,607,435 patent, discussed supra, which had a very narrow particle size distribution.

The alkali metal oxide/alumina-containing mixture, referred to hereinabove, can be prepared in several ways such as that described in U.S. Pat. Nos. 3,446,677, 3,488,271 and 3,475,225 (assigned to Ford Motor Company) and U.S. Pat. No. 3,607,435 assigned to General Electric Company. The mixture is prepared, preferably, by heating together, at crystal forming temperatures, alpha alumina ($Al_2O_3$) and sodium oxide ($Na_2O$) or $Na_2O$ precursor salts, in amounts sufficient to provide the desired final ceramic composition as defined supra. The "$Na_2O$ precursor salts" refer to appropriate Na salts which, under the beta alumina-type ceramic forming conditions, yield the corresponding oxides. Preferred salts include the nitrates and carbonates of sodium.

Small amounts of doping materials, i.e., dopants such as MgO, $Li_2O$, NiO, CuO, $Y_2O_3$, $ZrO_2$ and the like may be added to the mixture, if desired. the dopants act, in part, to increase the stability of the beta alumina-type ceramics, once formed, with regard to temperature and to lower the overall ceramic electrical resistivity. In addition, the dopants enhance densification. The metal salts may be added to the mixture in the oxide form or, alternatively, as precursor salts which yield the oxide form under the calcination conditions, e.g., the nitrates or carbonates. A detailed discussion of doped beta alumina is presented in an article appearing in the Electrochemical Society Extended Abstracts - Los Angeles Metting - May 10–15, 1970 entitled "Ionic Conduction In Impurity Doped Beta Alumina", by Atsuo Imai et al and in U.S. Pat. No. 3,671,324 patented June 20, 1972 to Atuso Imai et al, the disclosures of which are incorporated herein by reference. Preferred doping agents comprise lithium or magnesium oxide or mixtures thereof.

The alpha alumina comprises a major portion by weight of the initial mixture and advantageously comprises above about 80 weight %, preferably above about 85 weight % of the total mixture. The $Na_2O$ comprises a minor portion by weight of the mixture, advantageously between about 5 and about 15 weight %, preferably between about 8 and 11 weight % of the total mixture. The dopant, if present, comprises a minor portion by weight of the mixture, e.g., at least about 0.1 weight % of the total mixture, advantageously about 0.1 to about 5, preferably about 0.1 to about 2.5 weight % of the total mixture.

The components of the above-defined mixture may be dry-blended in any type of mixing device which permits the formation of a uniformly distributed solid powder. Alternatively, the mixture may be slurried in an appropriate vehicle (solvent) and the vehicle subsequently evaporated.

As a preliminary step to calcination, the mixture of raw materials may be pelletized, if desired, although this is not a neccessary step in obtaining the ceramic product of this invention. Pelletization serves to compact the components thereby increasing the overall bulk density of the mixture. Any type of pelletization process that can accomplish the process objectives can be used, such as isostatic pressing of the components at pressures ranging between about 1000 and 10,000 psi, preferably about 2000 psi, die pressing and the like.

After achieving an intimate admixture and compaction of the raw materials, it is necessary to calcine the mixture at elevated temperatures. The calcination operation serves to remove volatile constituents from the raw materials and to consolidate the alpha alumina, alkali metal oxide and/or dopant. Further, if the oxide and dopant are prepared in situ, decomposition of the precursor salts occurs during calcination. In addition, other reactions which may occur are shown below:

$$Na_2O + Al_2O_3 \rightarrow 2NaAlO_2 \qquad (1)$$

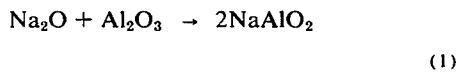

$$NaAlO_2 + Al_2O_3 \rightarrow Na_2O \cdot XAl_2O_3 \qquad (2)$$

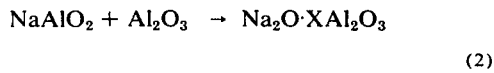

where X varies between 5 and 11.

It is noted, however, that while the above reaction sequence may occur to some extent, to form some beta and beta'' alumina, this is a minor consequence of the calcination.

the calcination reaction is run at a temperature ranging between about 800° and 1600°C., most preferably between about 850° and 1150° C., for a time ranging, desirably, between about 0 and 8 hours, most preferably between about 0.5 and 2 hours.

The calcined particles have a broad particle size distribution and are characterized by having surface areas ranging between about 2 and 40 m²/gms., preferably between about 5 and 12 m²/gms. A wide range of particle sizes is desirable since there are smaller particles available to fit into the interstices formed by the packing of the larger particles, thereby decreasing the void volume of the ceramic product and ultimately yielding a low porosity beta alumina-type membrane characterized by low electrical resistivity and good mechanical strength.

It is postulated that alpha alumina forms green bodies of high density, without unfavorable crystalline orientation vis-a-vis ceramics prepared from other alumina forms, e.g., gamma alumina, thereby providing a low resistivity material. Since alpha alumina particles pack to a high bulk density, this enables the use of relatively low temperatures, e.g., less than about 1700°C., during the subsequent firing (sintering) operation, which operation, which operation (discussed in more detail hereinbelow) results in the formation of a high density microstructure of randomly oriented beta alumina-type crystals. The use of low sintering temperatues, in part (see further discussion below), enables the formation of a substantial amount of the low resistivity beta'' alumina-type ceramic before sodium volutilization (resulting from the use of temperatures above 1250°C.) results in unfavorable transformation of the beta'' form to the higher resistivity beta form of the ceramic.

In contradistinction, gamma alumina reacts with the sodium oxide during calcination, at temperatures as low as 1100°C., forming beta alumina crystals of small size and poor packing characteristics which ultimately results in lower density, higher electrical resistivity ceramics.

Subsequent to the calcination, it is desirable to crush all the lumps and pellets to a favorable surface area and particle size distribution. In a preferred embodiment, the calcined material, after further processing, will pass a 10 mesh sieve. Milling is used to further reduce particle size. Thus, the calcined material, in one embodiment, it placed in a container which is rotated at a set speed in the presence of a grinding cylinder, used to break up the powder during the rotational sequence. If desired, a minor amount of grinding aid, such as ethyl alcohol, comprising, e.g., about 0.5 weight % of the total mixture, may be added to facilitate the grinding. In general, the milling time ranges between about 4 and 24 hours, preferably between about 6 and 10 hours.

The calcined, milled mixture is then formed into a desired shape, and, thereafter, sintered at elevated temperatures ranging between 1400° and 1700°C., preferably between 1540° and 1600°C., for a time ranging, preferably, between about 2 and 16 hours.

The shape of the final ceramic product is not important, and such shapes as a flat sheet, a tube, disk or the like may be formed. A preferred forming technique is described in U.S. Ser. No. 316,732, filed Dec. 20, 1972, which disclosure is incorporated herein by reference. The forming process detailed therein is referred to as a "Doctor Blading" process and comprises admixing the calcined, milled powder with a volatile organic vehicle, a wetting agent, an organic binder and a plasticizer in varying proportions, and, thereafter, depositing the mixture on a smooth flexible supporting tape as a thin film. The volatile organic vehicle is removed from the film while retaining the remaining constituents of the mixture in adherent relationship to the flexible supporting tape. Thereafter the film may be removed from the tape and sintered to yield a rigid beta alumina-type ceramic sheet.

The forming technique of the subject invention is not limited to the "Doctor Blading" technique but may also comprise the more standard techniques of die pressing, extrusion and the like. Examples of such techniques are disclosed in U.S. Pat. Nos. 3,488,272, 3,607,435, 3,625,773 and 2,966,719, which discloses are incorporated herein by reference.

Subsequent to the forming operation, the mixture is sintered at temperatures ranging between about 1450° and 1700°C, preferably between about 1500° and 1650°C., most preferably between about 1540° and 1600°C., for a time ranging between about 2 and 24 hours, preferably between about 4 and 16 hours, thereby causing a substantial reaction between the alpha alumina particulate and the other components of the mixture. The reaction results in the formation of a beta alumina-type ceramic comprising a major amount of beta'' alumina and a minor amount of beta alumina. A packing powder having the same general formula as the ceramic mixture and/or special atmospheric conditions may be used to prevent excessive sodium oxide loss from the ceramic under the sintering conditions. Thus, for example, a sodium, dry oxygen or argon atmosphere may be used. The sintering operation is preferably conducted in an oxidative atmosphere, a typical atmosphere being air.

It is noted that beta'' alumina is unstable at temperatures above about 1250°C. converting to beta alumina with concomitant sodium volatilization. Thus, low temperatues, e.g., below about 1250°C. favor the beta'' form. Although higher temperatures are employed during sintering, the unfavorable conversion can be minimized by use of dopants and/or the special atmospheric conditions referred to above.

The ceramic membrane, as indicated previously, finds great utility as a solid electrolyte in an electrolytic cell such as that described in U.S. Pat. No. 3,488,271, hereinabove referred to. In addition, the use of the membrane in an electrolytic cell is exemplified in the following U.S. patents, the disclosures of which are incorporated herein by reference: Nos. 3,785,965, issued Jan. 15, 1974, 3,791,966, issued Feb. 12, 1974, 3,788,978, issued Jan. 29, 1974 and 3,787,315 issued Jan. 22, 1974, all assigned to Esso Research and Engineering Company.

When flat sheet membranes are employed, the mechanical strength thereof can be increased by incorporting a plurality of small sheets of the beta alumina-type ceramic into a supporting framework in order to form a window-frame type structure. The supporting framework can be of any material which is nonreactive with the cathodic and anodic substances in the cell, and which does not conduct electrodes. Examples of such materials include "pyroceram" (a crystalline body with a glassy matrix), machineable ceramic (a special type of "pyroceram"), glass, etc. The beta alumina-type ceramic can be sealed into the openings of the supporting frame by means of a sealing glass.

DESCRIPTION OF THE PREFERRED EMBODIMENT

The present invention will be more clearly understood by reference to the following examples:

EXAMPLE 1

A solid electrolyte of beta alumina-type ceramic was prepared in the following manner: 1. Powders of $Na_2CO_3$ and alpha $Al_2O_3$ were added together in the proper amounts to achieve a molar ratio of $Na_2O \cdot 6\ Al_2O_3$. The alpha $Al_2O_3$ was characterized by having an hexagonal crystal structure with a particle size (diameter) of less than one micron and a rather wide particle size distribution. A phase stabilizer, e.g., MgO, was then added as basic magnesium carbonate to achieve the final molar composition $$0.4\ MgO \cdot Na_2O \cdot 6\ Al_2O_3$$

2. These materials were then mixed to achieve a homogeneous distribution and calcined at 1050°C. for 1 hour. The calcined material was then milled for 8 hours and pressed into disks. 3. The disks were die pressed at 25,000 psi and sintered in an electric furnace which was held at 1560°C. for 15 hours. In the sintering process the disks were placed in a covered crucible and surrounded by packing powder of the same composition as the disks themselves. 4. The density and specific resistivity of the disks were measured. 5. Both AgI/Ag and evaporated aluminum electrodes were utilized to measure the resistance of the disks at room temperature. Measurements were made at 1.5 m.c. with alternating current. Resistivity was then calculated. The following results were obtained and indicate the low specific resistivites obtainable via the the subject process.

Table I

| Disk No. | Density g/cc | Electrode | Specific Resistivity ($\Omega$-cm) 25°C.; 1.5 m.c. |
|---|---|---|---|
| 1 | 3.17 | AgI/Ag | 71.20 |
| 2 | 3.16 | AgI/Ag | 91.54 |
| 3 | 3.15 | Al | 89.79 |
| 4 | 3.15 | Al | 91.27 |

EXAMPLE 2

A test was made to observe the differences incurred by use of various alumina sources. Two specific compositions were processed, one composition using the same alpha alumina as in Example 1 and the other composition using a gamma alumina characterized by having a cubic crystal structure, a particle size (diameter) of about 0.05 microns and a narrow particle size distribution. Both compositions were blended and subsequently calcined at 1090°C. for 1 hour.

X-ray analysis of the two samples showed that in the case of the gamma alumina-based material, there was substantial conversion to the beta" alumina with only minor phases of NaAlO$_2$ and beta alumina appearing, while the major phase with the alpha alumina was alpha alumina.

Disks of these materials pressed and sintered under identical conditions gave vastly different results as noted in the following Table:

Table II

| Disk No. | $Al_2O_3$ Source | Green Body Density g/cc | Sintering Conds Time (hrs) | Sintering Conds Temp. °C. | Density g/cc | Specific Resistivity ($\Omega$-CM) 25°C. 1.5 m.c. |
|---|---|---|---|---|---|---|
| 1 | alpha | 2.03 | 8 | 1600° | 3.11 | 82.2 |
| 2 | alpha | 2.03 | 8 | 1600° | 3.18 | 66.5 |
| 3 | gamma | 1.68 | 8 | 1600° | 2.70 | 253 |
| 4 | gamma | 1.68 | 8 | 1600° | 2.69 | 267 |

The substantial differences in resistivity between the alpha and gamma alumina-based materials are apparent.

EXAMPLE 3

Disks of the gamma alumina-based materials processed as in Example 2 were subjected to a series of sintering temperatures.

Table III

| Gamma alumina-based Disks (Ave.) | 1600°C. | 1625°C. | 1650°C. |
|---|---|---|---|
| Density (%$\rho_t$) | 83.4 | 89.5 | 90.1 |
| Apparent Porosity | 4.908 | 0.752 | 0.403 |
| Specific Resistivity ($\Omega$-CM) 25°C. 1.5 m.c. | 260 | 222 | 158 |

It is clear that lower resistivities are only attainable with gamma alumina when higher, less efficient sintering temperatures are used. However, even at the higher temperatures, the resistivity is much higher than that of the alpha alumina-based materials.

EXAMPLE 4

This Example is similar to Example 2, but provides more detailed data regarding the physical characteristics of the materials. The starting materials are the same as used in Example 2.

Table IV

| $Al_2O_3$ | alpha alumina | gamma alumina |
|---|---|---|
| Calcined Temp. (°C.) | 1090 | 1090 |
| Major Phase After Calcine | $\alpha Al_2O_3$ | $B''$-$Al_2O_3$ |
| Surface Area (M$^2$/g) | 7.0 | 21.0 |
| Green Body Density (g/cc) Equal Pressures Used) | 2.03 | 1.68 |
| Sintering Temp. (°C.) | 1600 | 1600 |
| Fire Density (%$\rho_t$) | 96.3 | 83.4 |
| Apparent Porosity | 0.18 | 4.91 |
| Resistivity ($\Omega$-CM) at 25°C. 1.5 m.c. | 74.4 | 260 |

It is seen that the alpha alumina-based material has a substantially lower apparent porosity, surface area and resistivity than the gamma alumina-based material.

What is claimed is:

1. A process for the preparation of a crystalline beta alumina-type ceramic comprising a major amount of beta" alumina having the steps of
   a. preparing a homogeneous mixture comprising powders of alpha alumina and an alkali metal oxide, the alumina/alkali metal oxide mole ratio in the mixture ranging between about 5 and about 11,
   b. calcining said mixture at a temperature ranging between about 850° and 1150°C., said temperature being insufficient to cause substantial reaction of alpha alumina and alkali metal oxide to form a material selected from the group consisting of beta or beta" alumina, c. forming said calcined mixture thereby obtaining a dense green containing a major amount of alpha alumina, and d. sintering the green body at a temperature ranging between about 1450° and 1700°C., thereby obtaining a crystalline beta alumina-type ceramic comprising a major amount of beta'' alumina.

2. The process of claim 1 wherein said homogeneous mixture contains a minor amount of doping agent selected from the group consisting of MgO, Li$_2$O, Y$_2$O$_3$, CuO, ZrO$_2$, NiO and mixtures thereof.

3. The process of claim 2 wherein said doping agent constitutes between about 0.1 and 5.0 weight % of said homogeneous mixture.

4. The process of claim 2 wherein the alkali metal oxide is Na$_2$O and is formed from a sodium oxide precursor salt selected from the group consisting of sodium carbonate and sodium nitrate.

5. The process of claim 1 wherein the beta alumina-type ceramic is in the shape of a flat sheet and wherein a plurality of said sheets are incorporated into a supporting framework so as to form a window frame-type structure.

6. The process of claim 1 wherein the sintered ceramic of step (d) contains randomly oriented beta alumina-type crystals.

7. A process for the preparation of a crystalline beta alumina-type ceramic comprising a major amount of beta'' alumina, characterized by having an electrical resistivity at 25°C. of less than about 100 ohms-centimeters, having the steps of a. preparing a homogeneous mixture comprising powders of alpha alumina, sodium oxide and a dopant, the alumina/sodium oxide mole ratio in the mixture ranging between about 5 and 11, b. calcining said mixture at a temperature ranging between about 850° and about 1150°C, said temperature being insufficient to case substantial reaction of alpha alumina and alkali metal oxide to form a material selected from the group consisting of beta or beta'' alumina, c. forming said calcined mixture thereby obtaining a dense green body containing a major amount of alpha alumina, and d. sintering said greenbody at a temperature ranging between about 1400° and 1700°C, thereby yielding a crystalline beta alumina-type ceramic comprising a major amount of beta'' alumina.

8. The process of claim 7 wherein the dopant is Li$_2$O, MgO, CuO, ZrO$_2$, NiO, Y$_2$O$_3$ or mixtures thereof and constitutes between about 0.1 and 5.0 weight % of said homogeneous mixture.

9. The process of claim 7 further characterized by milling said calcined mixture, and, thereafter, formulating said milled, calcined mixture into a slip containing a volatile organic vehicle, a wetting agent, an organic binder and a plasticizer, depositing said slip as a thin film on a smooth flexible support, removing at least a portion of the volatile materials contained in said film, while retaining the remaining constitutents of said film in adherent relationship to the support, and, thereafter, removing said film from said support and sintering said film.

10. The process of claim 7 wherein the average particle size (diameter) of the alpha alumina ranges between about 0.01 and about 2 microns.

11. The process of claim 7 wherein the beta alumina-type ceramic is in the shape of a flat sheet and wherein a plurality of said sheets are incorporated into a supporting framework so as to form a window frame-type structure.

12. The process of claim 4 wherein the beta alumina-type ceramic is represented by the formula Na$_2$O·XAl$_2$O$_3$, where X takes values ranging between about 5 and 11.

13. The process of claim 7 wherein the beta alumina-type ceramic is represented by the formula Na$_2$O·XAl$_2$O$_3$, where X takes values ranging between about 5 and 11.

14. The process of claim 7 wherein the sintered ceramic of step (d) contains randomly oriented beta alumina-type crystals.

* * * * *